United States Patent
Sandmeyer et al.

(10) Patent No.: US 10,125,225 B2
(45) Date of Patent: Nov. 13, 2018

(54) PROCESS FOR PREPARING ORGANOPOLYSILOXANES

(71) Applicant: Wacker Chemie AG, Munich (DE)

(72) Inventors: Frank Sandmeyer, Burgkirchen (DE); Georg Loessel, Emmerting (DE); Marko Prasse, Glaubitz (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/537,163

(22) PCT Filed: Jul. 21, 2016

(86) PCT No.: PCT/EP2016/067377
§ 371 (c)(1),
(2) Date: Jun. 16, 2017

(87) PCT Pub. No.: WO2017/016967
PCT Pub. Date: Feb. 2, 2017

(65) Prior Publication Data
US 2018/0265640 A1    Sep. 20, 2018

(30) Foreign Application Priority Data

Jul. 30, 2015 (DE) .......................... 10 2015 214 503

(51) Int. Cl.
*C08G 77/06* (2006.01)
*C08G 77/18* (2006.01)

(52) U.S. Cl.
CPC ............. *C08G 77/06* (2013.01); *C08G 77/18* (2013.01)

(58) Field of Classification Search
USPC .................................................... 528/10–43
See application file for complete search history.

(56) References Cited

U.S. PATENT DOCUMENTS

| | | | |
|---|---|---|---|
| 2,517,777 A | 8/1950 | Fenn et al. | |
| 2,661,348 A | 12/1953 | Welsh et al. | |
| 2,719,859 A | 10/1955 | Nitzsche et al. | |
| 2,758,124 A | 8/1956 | Schwenker | |
| 3,489,782 A | 1/1970 | Pruvost et al. | |
| 3,792,071 A | 2/1974 | Nitzsche et al. | |
| 4,209,454 A * | 6/1980 | Graf | C08G 77/02 556/457 |
| 4,298,753 A | 11/1981 | Schinabeck et al. | |
| 5,223,636 A | 6/1993 | Koshimura et al. | |
| 6,767,982 B2 | 7/2004 | Standke et al. | |
| 2002/0086907 A1 | 7/2002 | Standke et al. | |
| 2005/0288473 A1 | 12/2005 | Deforth et al. | |
| 2006/0167202 A1 | 7/2006 | Schattenmann et al. | |
| 2006/0167297 A1 | 7/2006 | Schattenmann et al. | |
| 2007/0078277 A1 | 4/2007 | Ackermann | |
| 2010/0076170 A1 | 3/2010 | Staiger | |
| 2012/0202960 A1 | 8/2012 | Staiger | |
| 2014/0005433 A1 * | 1/2014 | Stanjek | C07F 7/188 556/471 |
| 2014/0374656 A1 * | 12/2014 | Friedel | C07F 7/188 252/194 |

FOREIGN PATENT DOCUMENTS

| | | |
|---|---|---|
| DE | 854708 A | 11/1952 |
| DE | 953661 A | 12/1956 |
| DE | 954198 A | 12/1956 |
| DE | 1302773 B | 8/1972 |
| DE | 2415331 A1 | 10/1975 |
| DE | 102005003898 A1 | 8/2006 |
| DE | 102005003899 A1 | 8/2006 |
| DE | 102005047394 A1 | 4/2007 |
| DE | 102007004838 A1 | 7/2010 |
| DE | 102009045930 A1 | 4/2011 |
| EP | 1205505 A2 | 5/2002 |
| EP | 1772475 A1 | 4/2007 |
| GB | 674137 A | 6/1952 |
| GB | 1192506 A | 5/1970 |
| JP | 2006-206589 * | 8/2006 |

* cited by examiner

*Primary Examiner* — Marc S Zimmer
(74) *Attorney, Agent, or Firm* — Brooks Kushman P.C.

(57) ABSTRACT

Multistep continuous and semicontinuous hydrolysis and condensation of chlorosilanes with alcohol containing minimal water in a column in a first step to form a silicone resin intermediate, followed by further condensation provides silicone resins in reproducible fashion substantially free of hydrogen chloride, without reactor gelatin.

8 Claims, No Drawings

PROCESS FOR PREPARING ORGANOPOLYSILOXANES

CROSS REFERENCE TO RELATED APPLICATIONS

This application is the U.S. National Phase of PCT Appln. No. PCT/EP2016/067377 filed Jul. 21, 2016, which claims priority to German Application No. 10 2015 214 503.4 filed Jul. 30, 2015, the disclosures of which are incorporated in their entirety by reference herein.

BACKGROUND OF THE INVENTION

1. Field of the Invention

The invention relates to a partially or fully continuous process for the preparation of branched organopolysiloxanes from chlorosilanes via two steps, by reaction with alcohol and water to the desired degree of condensation, wherein the whole process operates without the use of additional organic solvents, no waste water is produced and the process is particularly suitable for the controlled, gelling-free condensation of very reactive chlorosilanes or chlorosilane mixtures.

2. Description of the Related Art

Processes for the production of branched organopolysiloxanes, also referred to as silicone resins, have long been known.

Compared to the hydrolysis of alkoxysilanes for the production of organopolysiloxanes (see for example DE1302773), a hydrolysis starting from chlorosilanes has the advantage that the production and isolation of the alkoxysilanes is no longer required, resulting in economic advantages.

Both continuous and also discontinuous processes for the production of organopolysiloxanes from chlorosilanes have long been known from many publications and patent specifications in the prior art.

At this point, reference may be made to patent specifications GB1192506, DE953661C, DE854708C and DE2415331 A, and US2005288473 as examples of discontinuous processes. A disadvantage in these processes is the high dilution necessary during the reaction, which is due to the high reactivity of the chlorosilane. A further disadvantage of the processes is due to the large excesses of water, which at the end of the reaction leads to phase separation, wherein hydrochloric acid liberated in the process is absorbed or neutralized in the aqueous phase. On the large industrial scale therefore, firstly there is a large volume of waste for disposal and secondly the hydrochloric acid is lost since it is only recoverable under uneconomical conditions.

By way of example of continuous chlorosilane hydrolyses, reference may be made to U.S. Pat. No. 3,489,782, DE954198, DE102005047394 A1, DE102009045930 A1 and DE102007004838 A1. In these processes also, large volumes of water are needed, which leads to the aforesaid waste water problems, and here also the water-dissolved hydrochloric acid is once again only recoverable under uneconomical conditions.

As well as these discontinuous and continuous processes, technologies using a column have also become established. These column processes enable markedly improved reaction control. Thus waste water phases are no longer generated and the hydrochloric acid liberated can be recovered at the column head as a gas. Relevant processes are described in U.S. Pat. No. 2,719,859, U.S. Pat. No. 3,792,071, U.S. Pat. No. 4,298,753, U.S. Pat. No. 6,767,982, U.S. Pat. No. 5,223,636 and U.S. Pat. No. 4,209,454. A common disadvantage of all these processes is that they lead exclusively to oligomers with a low degree of condensation. Polyorganosiloxanes with a high degree of condensation are not accessible with these processes.

U.S. Pat. No. 2,719,859 teaches a process for the production of polyorganosiloxanes in a column which is characterized in that the hydrolyzable silanes are introduced finely divided into a continuous stream of an aqueous hydrolysis medium, with the hydrolysis medium always being present in excess. The process requires large volumes of water, which later have to be processed as waste water or discharged. Since the hydrolysis medium is always used in excess and used for product discharge, the column equipment used is always full of the hydrolysis medium, which results in a low space-time capacity. Silanes which can stabilize to cyclic polysilanes, or silane mixtures which contain a sufficient quantity of end stoppers can be used solvent-free here. Network-forming silanes which on complete condensation form T or Q units can only be used diluted in inert solvents and in the presence of less reactive silanes without forming insoluble gels, which further impedes the workup and significantly limits the range of applicability of the process.

U.S. Pat. No. 3,792,071 teaches a continuous process for the production of alkoxysilanes or alkoxypolyorganosiloxanes with a low degree of condensation from chlorosilanes. The process is performed using a distillation column as the reaction vessel. The chlorosilane, an alcohol required for the alkoxylation and water required for the condensation for the production of polyorganosiloxanes are fed into the column at different points. The chlorosilane is applied on the column head, and the alcohol in a column part under this or in the lower third of the column. Since the internal temperature of the column in the greater part of the column is always maintained at least half a degree over the boiling point of the alcohol, this is gaseous in the column and meets the downward-moving chlorosilane in countercurrent. For the production of alkoxysilanes, no solvent and no water are needed in this process. For production of condensed polyorganosiloxanes, both are needed in this process, thus as well as the alcohol present in any case, a further inert organic solvent such as toluene is present in the column, whose boiling point lies above that of the alcohol used. The solvent is introduced into the column in that the chlorosilane is dissolved in the solvent and fed into the column as a solution. Water and alcohol are fed into the column at a temperature which lies just above their boiling temperature, so that they are fed into the column in gaseous form.

The chlorosilane is at ambient temperature before it is fed into the column.

A molar excess of alcohol based on the moles of silicon-bonded chlorine used is always used.

The process is characterized in that in the products obtained a very low residual acid content in the single digit ppm range is obtained, without neutralization or washing steps specific for this being necessary following the column process.

Disadvantageous in this process are the low space-time capacity, the susceptibility of olefinically unsaturated silanes to polymerization under the reaction conditions of the process (as shown in comparative examples A and B in U.S. Pat. No. 4,298,753) and the fact that for the condensation to polyorganosiloxanes an inert organic solvent must be used, which is difficult to later remove. Solvent-intolerant applications such as personal care can therefore not be implemented with such products or the residual traces of solvent must be removed from the products at considerable expense, which makes them uneconomical.

A further disadvantage is that the column is constantly operated at elevated temperature and since some chlorosilanes such as methyltrichlorosilane have relatively low boiling points, mixtures of different chlorosilanes are separated from one another in the column and thus react with one another in rather random ratios, so that with this process it is more difficult to produce a polyorganosiloxane of constant composition from chlorosilane mixtures.

U.S. Pat. No. 4,209,454 teaches a continuous process for the production of polyorganoalkoxysiloxanes. In this process, chlorosilanes are applied directly onto a column, which is mounted on a reactor. The application of the chlorosilanes must be effected at a certain minimum distance from the reactor in order to allow a sufficiently long reaction time. The reactor contains alcohol, water and the polyorganosiloxane to be produced. No further solvent is contained in the apparatus. The contents of the reactor are heated to boiling, so that the alcohol and optionally water come into contact with the chlorosilane in countercurrent.

The advantage of this process is that it is possible to control the alkoxy content better than in other processes which propose a similar procedure, such as for example GB674137, so that the tendency towards gel formation is better controlled with this procedure, as the examples from U.S. Pat. No. 4,209,454 confirm in particular compared to GB674137.

However, this process is not tolerant towards olefinically unsaturated silicon-bonded substituents.

Since the column is constantly operated at the boiling temperature of the evaporable constituents from the reactor and some chlorosilanes, for example methyltrichlorosilane, have relatively low boiling points, mixtures of different chlorosilanes such as phenyltrichlorosilane and methyltrichlorosilane are separated from one another in the column and a part thereof discharged into the exhaust gas and are thus lost. As a result, the process displays a poorer profitability, since higher quantities of educt are necessary per quantity unit of product. Further, shifts in the stoichiometric composition cannot be excluded, so that with this process also it is more difficult to produce a polyorganosiloxane of constant composition from chlorosilane mixtures.

U.S. Pat. No. 4,298,753 teaches a two-stage alkoxylation process, or a two-stage alkoxylation and condensation process for the production of alkoxysilanes or polyorganoalkoxysiloxanes of a low degree of condensation, in which a column is used for the second condensation stage. The first condensation stage is also operated continuously, for which a reactor upstream of the column is used, which can be a stirring device or a loop. In this pre-reactor, the chlorosilane and the alcohol are metered in parallel, wherein the alcohol is used in sub-stoichiometric quantity based on the quantity of hydrolyzable silicon-bonded chlorine. The pre-reactor is not heated. The reaction mixture thus obtained is discharged at a preparation temperature between 0 and 20° C. from the pre-reactor and fed onto the head of the column. The column is adjusted to an elevated temperature. Further alcohol is fed into the column below the feed point for the reaction mixture from the pre-reactor, and this at least in a quantity which suffices to completely hydrolyze all silicon-bonded chloride residues still present. Water for a condensation is fed into the column, not into the pre-reactor.

The chlorosilane is at ambient temperature before it is fed into the reactor. The process is also operable for mixtures of different chlorosilanes. If water is fed into the column for a condensation, the chlorosilanes are dissolved in an inert solvent, with the boiling point of the inert solvent lying above the temperature at which the column is operated.

Suitable as alcohols are those whose boiling point lies below the boiling point of the chlorosilane used.

Hydrochloric acid is recovered both from the pre-reactor and also from the reaction column. The products obtained have residual hydrochloric acid contents in the single digit ppm range.

The process is efficient and suitable for producing alkoxysilanes solvent-free. For the production of organopolysiloxanes no example is given. Also disadvantageous in this case is that for the production of polyorganosiloxanes the use of additional inert solvents such as toluene, which later have expensively to be removed, is necessary. Also, during the later stripping of the target products, solvent mixtures of the relevant alcohol and the additional inert solvents are obtained, which because of the reaction procedure cannot easily be used again, but instead must first be expensively separated from one another, if this is not prevented by the formation of azeotropic mixtures and similar effects.

U.S. Pat. No. 5,223,636 teaches a column process for the production of polyorganoalkoxysiloxanes, in which a column is used which is mounted onto a reactor. At the start an alkoxysilane, which is the fully alkoxylated version of the halosilane which is continuously fed onto the column during the process, is fed into the reactor. Water and alcohol are continuously fed into the reactor. The halosilane is alkoxylated in countercurrent to the boiling components from the reactor, mainly the alcohol, and together with the alkoxysilane hydrolyzed and condensed, wherein the hydrohalic acid which is liberated during the halosilane alkoxylation and hydrolysis is used as the catalytic acid. This procedure admittedly has the advantage that no extra catalytic acid has to be added, but the disadvantage that the quantity of acid is not only poorly controllable, but also markedly higher than with a specific addition. Since it is usual in such plants on the production scale to feed the acid in from a connector with fixed pipes, the advantage of the saving in catalyst is to be estimated as rather slight, since this is countered by the major disadvantage of the poorly controllable reaction conditions. Further, larger quantities of acid which must subsequently be removed remain in the product. With such a procedure, limits are set to the achievable degree of condensation. For low degrees of condensation, such a procedure is acceptable. However, the tendency to gelling increases markedly with increasing degree of condensation, so that at higher degrees of condensation, the process is no longer sufficiently robust.

In order as far as possible to control the quantity of hydrohalic acid, in U.S. Pat. No. 5,223,636 the use of an auxiliary gas stream is proposed in order to drive the hydrohalic acid gas out from the reaction system. This essentially complicated process thus entirely negates the alleged advantages.

As the examples of U.S. Pat. No. 5,223,636 show, the quantities of HCl remaining in the product are markedly greater than 100 ppm, which even at the time of the patent application was already an outdated prior art.

U.S. Pat. No. 6,767,982 teaches a continuous two-stage process for the production of linear polyorganoalkoxysiloxanes, characterized in that every silicon atom bears at least one alkoxy substituent, and in that in a first step in a first reactor a partial alkoxylate is produced from a mixture of halosilanes, alcohol and water, which in a second step is applied onto a reaction distillation column, on which the further condensation to the end product takes place with addition of further alcohol. Optionally, the reaction mixture during the transfer from the pre-reactor onto the column is passed through a heating unit and temperature-controlled. During the process, hydrohalic acid in gaseous form is produced, which is removed from the system. The hydrohalic acid dissolved in the liquid phase remains in the system. Here, similarly to previously in U.S. Pat. No. 5,223,636, hydrohalic acid generated during the synthesis is used as a catalyst, i.e. the liquid phase is supersaturated with hydrohalic acid. Since in the first step of this process water is already present, hydrohalic acid is dissolved up to saturation of the aqueous alcoholic phase, so that a saturated halogen acid aqueous environment is present for the hydrolysis and condensation. In example 1 in EP1772475 B1, where a somewhat comparable continuous process for the production of polyorganosiloxanes is described, it is stated that such a saturated ethanol-water solution is very reactive and for the reduction of its reactivity requires considerable dilution in the case of EP1772475 B1 with water, in order to minimize its reaction-promoting action. In EP1772475 B1, a water-insoluble inert, organic solvent for the polyorganosiloxane is used in order to protect it from excessive condensation and to extract it from the water-ethanol phase. In this manner, according to EP1772475 B1, high degrees of condensation are possible. In the case of U.S. Pat. No. 6,767,982, just such a concentrated ethanol-water mixture is admittedly added, but at the same time the use of solvents is dispensed with. Such a procedure is limited to low degrees of condensation, since with increasing condensation the risk of gelling increases unacceptably and the process can no longer be robustly operated. It is therefore logical if U.S. Pat. No. 6,767,982 targets only linear polyorganosiloxanes, which must have an alkoxy content of more than 25 mol. %.

Further, the use of water in a process stage in which still greater quantities of hydrohalic acid are formed has the effect that a greater proportion of hydrohalic acid is carried over in the workup of the liquid phases and is as a result lost or has to be discharged in the waste stream.

DE102005003899 A1 teaches a process for continuous production of low alkoxy silicone resins. The purpose of this process is the production of highly condensed organopolysiloxanes, for example solid silicone resins. The process is characterized in that halosilane is reacted in a column in the presence of water and alcohol, with the desired organopolysiloxane also already being present in the reaction system. Water and alcohol are added to the reaction unit so that more water is always present than is necessary for the complete hydrolysis of all silicon-bonded halogen groups. The excess of water allows the control of the condensation reaction. It is performed in a system consisting of two different distillation columns, the first of which is configured as a pure reaction column, the second as a reaction and stripping unit. This process also requires the use of inert organic solvents such as aromatic solvents, since highly condensed organopolysiloxanes form, which display a high viscosity. These are only still manageable in solution.

DE102005003898 A1 teaches a continuous process for the production of alkoxy-functionalized polysiloxanes from chlorosilanes, wherein a double column system with a pre-reactor is used here as the reaction unit. The great advantage of this arrangement consists in that through the production of a partial alkoxylate in the pre-reactor, only a relatively small quantity of hydrochloric acid gas is still formed in the column system. The smaller volume of hydrochloric acid gas thus no longer has a major capacity-limiting action in the columns and the space-time capacity of the column system therefore increases markedly.

The second column is run as a stripping column and makes no contribution to the condensation. In the second column, an inert organic solvent is optionally used. However, it is not explicitly stated in which cases the need exists to use such an inert organic solvent. It is however obvious that the solvent-free mode of operation following this process is at least problematical and thus not consistently possible, although as target products no highly condensed alkoxy-rich siloxanes are obtained but only those with a low degree of condensation. The process is only suitable for producing highly alkoxy-functionalized oligomers with a low degree of condensation, but not for setting higher degrees of condensation.

PROBLEMS ADDRESSED BY THE INVENTION

The purpose of the invention is to provide a partially or fully continuous, economical process for the production of polyorganoalkoxysiloxanes from chlorosilanes or mixtures of chlorosilanes which
  makes it possible to produce polyorganosiloxanes of constant composition reproducibly from mixtures of different chlorosilanes,
  operates entirely without the use of inert organic solvents, i.e. which contains in the reaction mixture only the organic components required as reactants,
  generates no waste water phase,
  makes products with very low residual acid contents <10 ppm accessible
  makes it possible to adjust the alkoxy contents deliberately from high to low, so that it is suitable for providing low molecular weight and also high molecular weight polyorganosiloxanes right through to solids, and thus allows highest degrees of condensation in a robust procedure
  has a recovery rate for the hydrohalic acid liberated of at least 95%.

Surprisingly it is found that these problems are solved in all component aspects by the present invention.

SUMMARY OF THE INVENTION

One aspect of the invention is a fully continuous process for the production of branched organopolysiloxanes, wherein
  in a first step in a column as a first reaction unit at least one chlorosilane is continuously reacted with alcohol to give a polyorganosiloxane mixture of low degree of condensation (=silicone resin intermediate), wherein the reaction takes place
    a) with alcohol and water, or
    b) with alcohol, water and at least one further chlorosilane, which differs from the first chlorosilane as follows:
      it is less volatile, thus has a higher boiling point and can moreover have a lower reactivity,
      and
    c) 0.1 to 2.0 moles alcohol are used per mole of hydrolyzable chlorine, and
    d) the alcohol contains at most 5 wt. % water, and
  in a second step the silicone resin intermediate from the first step is transferred into a continuous loop reactor, or a stirred batch reactor with continuous input and output or a continuously connected stirring device cascade as a second reaction unit, and there a reaction takes place
  a) with alcohol and water and in the presence of catalytic traces of hydrogen chloride, or
  b) with alcohol and water and in the presence of catalytic traces of hydrogen chloride and with addition of further alkoxy- and/or hydroxy-functionalized organopolysiloxanes or alkoxy- and/or hydroxy-functionalized silanes,
to give the end product, a branched organopolysiloxane with the desired degree of condensation,
with the proviso that during the whole process, apart from the alcohol, no other solvent is used,
wherein this alcohol can consist of only one type of alcohol or of a mixture of at least two different alcohols.

DETAILED DESCRIPTION OF THE PREFERRED EMBODIMENTS

A further subject of the invention is a partially continuous process for the production of branched organopolysiloxanes, wherein
  in a first step in a column as a first reaction unit at least one chlorosilane is continuously reacted to give a polyorganosilane mixture of low degree of condensation (=silicone resin intermediate), wherein the reaction takes place
    a) with alcohol and water, or
    b) with alcohol, water and at least one further chlorosilane, which differs from the first chlorosilane as follows:
    Step differ as follows:
      it is less volatile, thus has a higher boiling point and can moreover have a lower reactivity,
      and
    c) 0.1 to 2.0 moles alcohol are used per mole of hydrolyzable chlorine, and
    d) the alcohol contains at most 5 wt. % water, and
  in a second step the silicone resin intermediate from the first step is transferred into a stirred discontinuously operated batch reactor as a second reaction unit, and there a reaction takes place
    a) with alcohol and water and in the presence of catalytic traces of hydrogen chloride, or
    b) with alcohol and water and in the presence of catalytic traces of hydrogen chloride and with addition of further alkoxy- and/or hydroxy-functionalized organopolysiloxanes or alkoxy- and/or hydroxy-functionalized silanes,
to give the end product, a branched organopolysiloxane with the desired degree of condensation,
with the proviso that during the whole process apart from the alcohol used no other solvent is used,
wherein this alcohol can consist of only one type of alcohol or of a mixture of at least two different alcohols.

A further embodiment both of the fully and also partially continuous process according to the invention is characterized in that
the hydrochloric acid-containing head distillate of the column arising in the first step is condensed and fed back onto the column a short distance below the input point of the reaction mixture from the pre-reactor, so that it does not reach the bottom of the column and thus the hydrochloric acid liberated in the column is completely removed from the reaction system, and as a result the silicone resin intermediate accumulates in the bottom of the reaction column without further workup with less than 100 ppm residual hydrochloric acid content.

Next, a workup/purification of the end product (=highly condensed, branched organopolysiloxanes) can take place by stripping. It is thus freed from volatile components and after this is present in its pure and thus final form. The stripping can be varied at will, by an suitable procedures, and for example, include distillation. Further examples of suitable variations are described in more detail below. The distillate which is obtained in the stripping of the product after the second step is described in the text that follows as a distillate of the second reaction unit.

As alcohols, preferably those hydrocarbon compounds with an alcoholic hydroxyl group which can be used for the production of alkoxysilanes or for the production of organopolysiloxanes by reaction of chlorosilane with alcohols and optionally water, and whose boiling points lie below that of the particular alkoxysilane or organopolysiloxane to be produced are used. Preferred are alkanols and alkanols substituted with ether oxygen, each with 1 to 6 carbon atoms, such as methanol, ethanol, n- or iso-propanol, beta methoxyethanol, n-butanol or n-hexanol. Particularly preferred are methanol, ethanol, iso-propanol and butanol, in particular methanol and ethanol. Mixtures of different alcohols can also be used, which can optionally be homogenized in a short mixing section before feeding into the particular reaction unit.

The hydrogen chloride arising in the process is preferably freed from the condensable components at the head of the first reaction unit, which are in turn passed back into the relevant reaction unit. The hydrogen chloride is thus available for its recovery as a gas.

As chlorosilane or chlorosilane mixtures, preferably those which are already used in the prior art for the production of alkoxysilanes or organopolysiloxanes by reaction of chlorosilane with alcohol and optionally water are used. These are in particular the silanes of the general formula (I)

$$R_nSiCl_{4-n} \qquad (I),$$

wherein
R is a hydrogen residue or an acid-stable C1-C18 hydrocarbon residue unsubstituted or substituted with heteroatoms and
n can have the values 0, 1, 2 or 3,
with the proviso that
n in at most 50% of the silanes of the formula (I) has the value 3 and
n in at least 20% of the silanes of the formula (I) has the value 0 or 1.

Since chlorosilanes are used here, acid stability of the residue R means stability against attack by hydrochloric acid.

In all formulae of the present disclosure of invention, the symbols have their meanings mutually independently. The silicon atom is always tetravalent.

Selected examples of hydrocarbon residues R are alkyl residues such as the methyl, ethyl, n-propyl, iso-propyl, n-butyl, iso-butyl, tert.-butyl, n-pentyl, iso-pentyl, and neo-pentyl, tert.-pentyl residues, hexyl residues such as the n-hexyl residue, heptyl residues such as the n-heptyl residue, octyl residues such as the n-octyl residue and iso-octyl residues such as the 2,2,4-trimethylpentyl residue, nonyl residues such as the n-nonyl residue, decyl residues such as the n-decyl residue, dodecyl residues such as the n-dodecyl residue, and octadecyl residues such as the n-octadecyl residue; cycloalkyl residues such as cyclopentyl; cyclohexyl, cycloheptyl and methyl-cyclohexyl residues; aryl residues such as the phenyl, naphthyl, anthryl and phenanthryl residues, alkaryl residues such as tolyl residues, xylyl residues and ethylphenyl residues; and aralkyl residues such as the benzyl and the ß-phenylethyl residues. Particularly preferred hydrocarbon residues R are the methyl, the n-propyl and the phenyl residues.

First Step

The silanes of the formula (I) can be used both as pure silanes and also as a mixture of different silanes of the formula (I). They are fed directly into the first reaction unit, i.e. into the column.

In the first reaction unit, both an alkoxylation of the chlorosilanes and also a condensation take place through the reaction of the chlorosilane or the chlorosilane mixtures with alcohol and water to give low degree of condensation organopolysiloxanes (described in the further text as silicone resin intermediates) and hydrogen chloride gas. The hydrogen chloride gas that forms is taken off from the column and recycled after removal of condensable components. The components condensable with refrigerating brine can be transferred back into the column. In the column, the chlorosilane or the chlorosilane mixture thus firstly meets alcohol which flows towards it as vapor from the column bottom, in which it is heated to boiling temperature. Thereby, alkoxysilanes, which migrate into the bottom of the column, are formed from the chlorosilanes. There they encounter a mixture of alcohol and water, so that they hydrolyze and condense, with the formation of oligomers. The degree of condensation is controllable via the quantity of water. The small quantities of residual chlorine content which the alkoxysilane or the alkoxysilane mixture brings with it is sufficient here as a hydrolysis catalyst. The hydrochloric acid liberated during the alkoxysilane formation in the column is taken off from the column. It is characteristic of the process that during this stage measures are taken which prevent introduction of the hydrochloric acid liberated during the alkoxysilane formation over and above the hydrochloric acid inevitably and unavoidably adhering to the alkoxysilane. Excessive acidification of the bottom by introduction of acid refluxes as sometimes stated as an advantage in the prior art for comparable processes, is thus explicitly to be avoided for the process according to the invention.

The viscosity of the isolated, stripped silicone resin intermediate after the first reaction unit is at most 600 mPas, preferably at most 500 mPas, and in particular at most 400 mPas, each at 25° C.

The alkoxy content of the pure stripped silicone resin intermediate after this first reaction unit is at least 20 wt. %, preferably at least 22 wt. % and in particular at least 25 wt. %. The quantity of silicon-bonded chlorine in this silicone resin intermediate of the first reaction unit is at most 100 ppm, preferably at most 75 ppm, more preferably at most 50 ppm, and most preferably at most 30 ppm.

Second Step

The reaction mixture containing the silicone resin intermediate from the first step is transferred into a second reaction unit comprising a loop reactor or stirred batch reactor with continuous input and output. Further, the use of continuously connected stirring device cascades of at least two stirring devices is possible. The second step can also be performed discontinuously in that a simple stirring device is used, in that the reaction is performed with a suitable holding time and then discharged for the workup.

In this second reaction unit, the further reaction takes place a) with alcohol and water and in the presence of catalytic traces of hydrogen chloride, which were brought in from step 1 and 2, to the desired condensation stage (=highly condensed, branched organopolysiloxane=end product). Preferably the mixture in the second reaction unit contains water in quantities of 4 to 17 parts by weight, more preferably 6 to 14 parts by weight; alcohol in quantities of 50 to 120 parts by weight, more preferably 60 to 100 parts by weight; and hydrogen chloride in quantities of 0.02 to 0.1 parts by weight, more preferably 0.04 to 0.08 parts by weight, each based on 100 parts by weight of pure stripped, silicone resin intermediates from the first step.

In a further embodiment b) the reaction with alcohol and water and in the presence of catalytic traces of hydrogen chloride takes place with addition of further alkoxy- and/or hydroxy-functionalized organopolysiloxane(s) or alkoxy- and/or hydroxy-functionalized silane(s). Here the further alkoxy- and/or hydroxy-functionalized organopolysiloxanes or alkoxy- and/or hydroxy-functionalized silanes are preferably liquid or they are soluble in the alcohol or the alcohol mixture which was used for the production of the silicone resin intermediate in the first step.

The additional alkoxy- and/or hydroxy-functionalized organopolysiloxanes are those preferably made up of repeating units of the formula (IV):

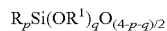
$$R_p Si(OR^1)_q O_{(4-p-q)/2} \qquad \text{Formula (IV):}$$

wherein
R has the meaning stated above,
$R^1$ are identical or different monovalent $C_1$-C6 alkyl residues or hydrogen, and
p and q are 0, 1, 2 or 3,
with the proviso that
$p+q \leq 3$ and
p in at least 20%, preferably in at least 30% and more preferably in at least 40% of all repeating units of the formula (IV), has the value 1.

The further additional alkoxysilanes preferably have the general formula (V):

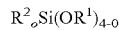
$$R^2_o Si(OR^1)_{4-o} \qquad \text{Formula (V):}$$

wherein
$R^2$ is a hydrocarbon residue unsubstituted or substituted with hetero atoms, wherein no nitrogen atoms are contained as heteroatoms,
$R^1$ has the meaning stated above and
o means 0, 1, 2 or 3.

A major advantage of the process according to the invention is that the further hydrolysis and condensation in the second step takes place without addition of further polar or nonpolar solvents and only with use of the alcohol or alcohol mixture used as reactant, to give the end product, the branched organopolysiloxanes of any desired degree of condensation.

Description of Implementation:

Below, the implementation of the process according to the invention is described by way of example on an apparatus. The plant comprises a column with circulation evaporator (first step) and a loop (second step).

First Step:

The first reaction unit consists of a circulation evaporator and a column mounted thereon. The column of the first reaction unit has above it firstly a water-operated condenser and then a brine-operated condenser. The distillates obtained there are fed back into the column. The hydrogen chloride gas obtained after the condenser can be recovered.

Second Step:

The second reaction unit consists of a loop or a stirred batch reactor with continuous input and output, a continuously connected stirring device cascade or a discontinuous stirring device, with the loop being preferred. A further variant is discontinuous subsequent condensation in the batch reactor.

From the circulation evaporator of the first reaction unit, as much reaction product mixture as is obtained through the reaction is withdrawn by means of a centrifugal pump and mixed with further water, optionally ethanol and catalytic quantities of hydrochloric acid or chlorosilane and reacted in the loop of the second reaction unit. From this loop of the second reaction unit, the end product is removed in the quantity in which it is formed.

The silicone resin intermediates which are obtained from the first step can be obtained as pure, stable products by normal measures, comprising the steps filtration, distillation and mixing, or formulated with other components into preparations.

Such components for preparations, apart from other silicon-containing components, here also include organic monomers or organic polymers, water, solvents, auxiliary agents such as emulsifiers, stabilizers, pH adjusters or other additives, fillers, pigments, and builders, where this enumeration is to be understood only by way of example and not as limiting.

The silicone resin intermediates are those which are built up of repeating units of the formula (II):

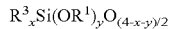

$$R^3{}_x Si(OR^1)_y O_{(4-x-y)/2}$$  Formula (II):

wherein $R^3$ means a residue R or $R^2$, each with the meanings stated above, $R^1$ has the meaning stated above, x and y are 0, 1, 2 or 3, with the proviso that $x+y \leq 3$ and x in at least 20%, preferably in at least 30% and more preferably in at least 40% of all repeating units of the formula (II) is value 1, and can also have the value 1 in 100% of all repeating units of the formula (II), and x averaged over all repeating units of the formula (II) has on average a value from 0.8 to 1.9, preferably from 0.85 to 1.9 and more preferably a value from 0.9 to 1.8, with x=1 and x=2 being especially preferable, y averaged over all repeating units of the general formula (II) has an average value from 0.6 to 2.0, preferably from 0.7 to 1.9 and more preferably from 0.8 to 1.9, wherein the silicone resin intermediates are in particular characterized in that they contain at least 20 weight percent residues $OR^1$, preferably at least 21 weight percent, especially preferably at least 22 weight percent, and in particular at least 23 weight percent, wherein in the silicone resin intermediates the units $OR^2$ are contained up to at most 10 wt. %, preferably at most 9 wt. %, more preferably at most 8 wt. % and in particular at most 7 wt. % as hydroxy groups. Silanol groups do not obligatorily have to be present in the silicone resin intermediates made up of repeating units of the formula (II).

The silicone resin intermediates have molecular weights in the range from 600 to 8,000 g/mol (weight average MA with a polydispersity (=PD) of at most 12. Preferably they have an $M_w$ from 650-5,000 g/mol with a polydispersity of at most 10, more preferably they have an $M_w$ from 700-4000 g/mol with a polydispersity of at most 8, and in particular they have an $M_w$ of 700-3000 g/mol with a polydispersity of at most 6. They are liquid as pure products, with their viscosities lying in the range from 10 to 2000 mPas, preferably 25-1500 mPas and more preferably 30 to 1000 mPas at 25° C. and standard pressure.

The end products which are obtained from the second step can be obtained as pure, stable end products by normal measures of workup, comprising the steps filtration, distillation and mixing, or be formulated with other components into preparations. The end products from this second step are liquid, highly viscous or solid as isolated pure end products, depending on the degree of condensation up to which they are condensed. The degree of condensation obtained is dependent on the reaction conditions which are selected in the second reaction unit. In particular, the degree of condensation is determined by the quantity of water and acid and the temperature, and the nature of the chosen acid and the order of metering and the metering rate which is selected in the second reaction unit. In principle, any combinations of these parameters are possible, with their selection being influenced by the result to be achieved. Since here the process in all its variability is a subject of the invention, here in principle no possible combinations are excluded, except for those which are obviously absurd since from them from the already known prior art it is obvious that they do not lead to the production of soluble or fusible and thus further processable organopolysiloxanes. Surprising in the present process is the fact that in contrast to the prior art the variability of the process and the product multiplicity resulting therefrom is achievable without the use of polar or nonpolar organic solvents, apart from the alcohol or alcohol mixture used. Liquid to viscous liquid end products are preferentially obtained when the reaction in the second step takes place with water in quantities from 4 to 10 parts by weight, based on 100 parts by weight of the pure stripped silicone resin intermediate from the first step.

Viscous liquid to solid products are preferentially obtained in the second step when the mixture contains water in quantities from 10 to 17 parts by weight, based on 100 parts by weight of pure stripped silicone resin intermediate from the first step.

The water used is preferably partially deionized water, fully deionized water, distilled or (multiply) redistilled water and water for medicinal or pharmaceutical purposes, especially preferably partially deionized water and fully deionized water.

Preferably the water used according to the invention has a conductivity at 25° C. and 1010 hPa of at most 50 µS/cm. The water used according to the invention is preferably air-saturated, clear and colorless.

Preferably the same alcohol is used in all steps, and preferably it is methanol or ethanol. The ethanol can contain usual denaturing agents, such as methyl ethyl ketone, petroleum ether or cyclohexane, with methyl ethyl ketone being preferred.

In the second step, hydrogen chloride can be added as hydrochloric acid or in the form of a precursor such as chlorosilane, acid chloride or linear phosphonitrilic chloride, with hydrochloric acid solutions, and in particular, aqueous hydrochloric acid solutions, being preferred.

In the second step, the components are preferably metered in singly, briefly mixed and metered thus into the loop. With the closed loop, the components can also be metered in singly before the circulation pump.

Preferably, the closed loop is operated at an absolute pressure from 1 to 5 bar, temperatures from 5 to 10° C. below the boiling temperature, an average residence time of 60 to 150 mins and with laminar to turbulent flow.

In the second step, the stirred batch reactor with continuous input and output is preferably operated at an absolute pressure of 1 bar, the boiling temperature of the mixture and with an average residence time of 60 to 150 mins. The average residence time is calculated from the reaction volume divided by the discharge rate of the reaction product.

Components which can be used together with the end product from step two in preparations are here other liquid or solid silicon-containing components also organic monomers or organic polymers, water, solvents, auxiliary agents such as emulsifiers, stabilizers, pH adjusters or further additives, with this enumeration being only by way of example and not to be understood as limiting.

The end products from the second step are those which are made up of repeating units of the formula (III):

$$R^3{}_a Si(OR^1)_b O_{(4-a-b)/2} \qquad \text{Formula (III)}:$$

wherein,
$R^3$ and $R^1$ have the meanings already stated above,
a and b are 0, 1, 2 or 3, with the proviso that
a+b≤3 and
a in at least 20%, preferably in at least 30% and more preferably in at least 40% of all repeating units of the formula (III) has the value 1, and can also have the value 1 in 100% of all repeating units of the formula (III), and a averaged over all repeating units of the formula (III) has a value from 0.8 to 1.9, preferably from 0.85 to 1.9 and more preferably a value from 0.9 to 1.8 wherein a=1 and a=2 are especially preferable values for a,
b averaged over all repeating units of the general formula (III) has an average value from 0.05 to 1.7, preferably from 0.06 to 1.6 and more preferably from 0.08 to 1.5, wherein the end products made up of repeating units of the formula (III) are in particular characterized in that they contain at most 25 wt. % residues $OR^1$, preferably at most 24 wt. %, more preferably at most 23 wt. %, and in particular at most 22 wt. %, wherein in the end products made up of repeating units of the formula (III) the unit $OR^1$ is present to an extent of 10 wt. %, preferably at most 9 wt. %, more preferably at most 8 wt. % in particular at most 7 wt. % as hydroxy groups. Silanol groups do not obligatorily have to be present in the end products. Here always at least 5 wt. % fewer residues $OR^1$ are contained in the end products than in the corresponding silicone resin intermediate, preferably at least 7 wt. % fewer, more preferably at least 10 wt. % fewer, and in particular at least 12 wt. % fewer, wherein in this case 100 weight percent of the residues $OR^1$ are the total number of the residues $OR^1$ from the silicone resin intermediates made up of repeating units of the formula (II).

The end products made up of repeating units of the formula (III) have average molecular weights Mw in the range from 1,000 to 50,000 g/mol (weight average) with a polydispersity (PD) of at most 20. Preferably they have a Mw of 1,250-30,000 g/mol with a polydispersity of at most 18, a Mw of 1,500-20,000 g/mol with a polydispersity of at most 15, and in particular they have a Mw of 1,500-15,000 g/mol with a polydispersity of at most 13. The Mw of the end products made up of repeating units of the formula (III) is at least 1.1 times the Mw of the silicone resin intermediates made up of repeating units of the formula (II), preferably at least 1.2, preferably at least 1.3 times, and in particular at least 1.4 times. Since the end products made up of repeating units of the formula (III) can both be liquid and also highly viscous or solid, they can extend over a very large viscosity range. If they are liquid organopolysiloxanes, their viscosity is preferably >600 mPas, more preferably >750 mPas and more preferably >1000 mPas at 25° C. and standard pressure.

The silicone resin intermediates produced according to the process according to the invention or the end products or the preparations obtainable therefrom are very suitable for use in anticorrosion preparations. In particular, they are suitable for use for the purpose of corrosion protection at high temperature.

Other than for the purpose of high temperature resistant corrosion protection, the silicone resin intermediates produced according to the process according to the invention or the end products or the preparations obtainable therefrom can also be used for corrosion protection of reinforcing steel in reinforced concrete, wherein the silicone resin intermediates according to the invention or the end products or the preparations obtainable therefrom can here be used both in pure form and also in preparations. Here corrosion-inhibiting effects in the reinforced concrete are obtained both if the silicone resin intermediates according to the invention or the end products or preparations thereof which contain these are introduced into the concrete mixture before it is brought into shape and hardened, and also by direct application onto the surface of the concrete after the concrete has hardened.

The silicone resin intermediates or the end products or preparations thereof can be used as binders for the production of artificial rocks for the indoor and outdoor sectors.

Other than for the purpose of corrosion protection on metals, the silicone resin intermediates produced by the process according to the invention or the end products can also be used for the manipulation of other properties of preparations or solid bodies or films obtainable therefrom:
  controlling electrical conductivity and the electrical resistance
  controlling flow properties of a preparation
  controlling gloss of a moist or hardened film or of an object
  increasing weathering resistance
  increasing chemical resistance
  increasing color hue stability
  reducing tendency to chalking
  reducing or increasing static and sliding friction on solid bodies or films
  stabilizing or destabilizing foam in the preparation
  improving adhesion of the preparation
  controlling filler and pigment wetting and dispersion behavior,
  controlling rheological properties of the preparation,
  controlling mechanical properties such as flexibility, scratch resistance, elasticity, stretchability, bendability, tearing behavior, resilience behavior, hardness, density, tear growth resistance, pressure molding residue, behavior at different temperatures, coefficient of expansion, abrasion resistance and further properties such as the thermal conductivity, combustibility, gas permeability, resistance to water vapor, hot air, chemicals, weather and radiation, the sterilizability, of solid bodies or films,
  control of electrical properties, such as for example dielectric loss factor, dielectric strength, dielectric constants, leakage current resistance, arcing resistance, surface resistance, specific breakdown resistance,
  flexibility, scratch resistance, elasticity, stretchability, bendability, tearing behavior, resilience behavior, hardness, density, tear growth resistance, pressure molding residue, behavior at various temperatures of solid bodies or films.

Examples of applications in which silicone resin intermediates or end products produced with the process according to the invention can be used in order to manipulate the properties indicated above are the production of coating materials and impregnations and coverings on substrates such as metal, glass, wood, mineral substrate, synthetic and natural fibers for the production of textiles, carpets and floor coverings, or other goods producible from fibers, leather, and plastics such as films and molded parts to be obtained therefrom. The silicone resin intermediates or end products can with appropriate choice of the preparation components also be used in preparations as an additive for the purpose of defoaming, flow promotion, hydrophobization, hydrophilization, filler and pigment dispersion, filler and pigment wetting, substrate wetting, promotion of surface smoothness, reduction of the static and sliding resistance on the surface of the hardened mixture obtainable from the preparation with additives. The silicone resin intermediates and end products produced by the process according to the invention can be incorporated in liquid or in hardened solid form into elastomer mixtures. Thereby, they can be used for the purpose of reinforcing or improving other use properties such as control of the transparency, heat resistance, tendency to yellow and weather resistance.

All the above symbols of the above formulae each have their meanings independently of one another. In all formulae, the silicon atom is tetravalent.

In the present text, substances are characterized by data obtained by instrumental analysis. The measurements on which these are based are either performed following publicly available standards or according to specifically developed methods. In order to ensure the clarity of the teaching communicated, the methods used are stated here:

Viscosity:

Unless otherwise stated, the viscosities are determined by rotational viscometry measurement according to DIN EN ISO 3219. Unless otherwise stated, all viscosity data apply at 25° C. and standard pressure of 1013 mbar.

Refractive Index:

The refractive indices are determined in the visible light wavelength range, unless otherwise stated at 589 nm at 25° C. and standard pressure of 1013 mbar in accordance with the standard DIN 51423.

Transmission:

The transmission is determined by UV VIS spectroscopy. A suitable instrument is for example the Analytik Jena Specord 200.

The measurement parameters used are range: 190-1100 nm step width: 0.2 nm, integration time: 0.04 s, measurement mode: step operation. Firstly, the reference measurement (background) is performed. A quartz plate mounted on a sample holder (dimensions of the quartz plates: H×B ca. 6×7 cm, thickness ca 2.3 mm) is placed in the sample beam path and measured against air.

The sample measurement is then performed. A quartz plate with applied sample—layer thickness of applied sample ca. 1 mm-mounted on the sample holder is placed in the sample beam path and measured against air. Internal offsetting against the background spectrum yields the transmission spectrum of the sample.

Molecular Compositions:

The molecular compositions are determined by nuclear magnetic resonance spectroscopy (for terminology see ASTM E 386: high resolution nuclear magnetic resonance spectroscopy (NMR): terms and symbols), wherein the $^1$H nucleus and the $^{29}$Si nucleus are measured.

Description of 1H NMR Measurement

Solvent: CDCl3, 99.8% d

Sample concentration: ca. 50 mg/1 ml CDCl3 in 5 mm NMR tube

Measurement without addition of TMS, spectral referencing of residual CHCl$_3$ in CDCl3 at 7.24 ppm Spectrometer: Bruker Avance I 500 or Bruker Avance HD 500

Probe head: 5 mm BBO probe head or SMART probe head (Bruker)

Measurement Parameters:

Pulprog=zg30

TD=64 k

NS=64 or 128 (depending on the sensitivity of the probe head)

SW=20.6 ppm

AQ=3.17 s

D1=5 s

SFO1=500.13 MHz

O1=6.175 ppm

Processing Parameters:

SI=32 k

WDW=EM

LB=0.3 Hz

Depending on the spectrometer type used, individual adaptations of the measurement parameters may be necessary.

Description of $^{29}$Si NMR Measurement

Solvent: C6D$_6$ 99.8% d/CC14 1:1 v/v with 1 wt. % Cr(acac)3 as relaxation reagent Sample concentration: ca. 2 g/1.5 ml solvent in 10 mm NMR tube Spectrometer: Bruker Avance 300

Probe head: 10 mm 1H/13C/15N/29Si glass-free QNP probe head (Bruker)

Measurement Parameters:

Pulprog=zgig60

TD=64 k

NS=1024 (depending on the sensitivity of the probe head)

SW=200 ppm

AQ=2.75 s

D1=4 s

SFO1=300.13 MHz

O1=−50 ppm

Processing Parameters:

SI=64 k

WDW=EM

LB=0.3 Hz

Depending on the spectrometer type used, individual adaptations of the measurement parameters may be necessary.

Molecular Weight Distributions:

Molecular weight distributions are determined as weight average Mw and as number average Mn, wherein the method of gel permeation chromatography (GPC or Size Exclusion Chromatography (SEC)) is used with polystyrene standard and refractive index detector (RI detector). Where not otherwise stated, THF is used as eluent and DIN 55672-1 applied. The polydispersity (PD) is the quotient Mw/Mn.

Glass Transition Temperatures:

The glass transition temperature is determined by dynamic difference calorimetry (Differential Scanning calorimetry, DSC) after DIN 53765, perforated crucible, heating rate 10 K/min.

EXAMPLES

Below, the process according to the invention is described in examples, however these should not be considered as limited thereto. All percentage data are based on weight. Unless otherwise stated, all manipulations are performed at room temperature of about 25° C. and under standard pressure (1.013 bar). The apparatus are normal commercial laboratory instruments such as are commercially offered by many instrument manufacturers.

Ph means a phenyl residue=$C_6H_5$—

Me means a methyl residue=$CH_3$—. $Me_2$ accordingly means two methyl residues.

$^i$Oct means an isooctyl residue, or a 2,2,4 trimethylpentyl residue, which is the same.

Example 1: Process According to the Invention, Fully Continuous Version. Combination of Column with Loop As the apparatus for the implementation of steps 1 and 2, a continuous alkoxylation plant is used, consisting of a 2.5 l sized circulatory evaporator with fitted 5 m long reaction column with a clear width of 50 mm, followed by a loop reactor with a fill volume of 1.5 l, in which step 3 of the process takes place.

The circulatory evaporator is filled with 2000 g ethanol and set to a bottom temperature of 78° C. (reflux ethanol). The reaction loop with 1.5 liter fill volume is filled with a mixture consisting of equal parts by weight of the alkoxy oligomeric polyorganosiloxane obtainable from steps 1 and 2 and ethanol, heated to 60° C. and circulated thus.

1500 g/hr of a mixture consisting of 1 part IO-trichlorosilane and 9 parts methyltrichlorosilane are metered onto the column, as well as 500 g/hr ethanol.

In the column, the chlorosilane mixture is partially alkoxylated by ethanol in vapor form in countercurrent, during which the HCl thus forming as a side product of the reaction escapes via a waste gas pipe.

Additionally, 500 g/hr ethanol and 140 g/hr water are fed into the reaction system via the bottom of the reaction column and heated to reflux (ethanol B.Pt.: 78° C.)

The alkylsilane trialkoxylate is condensed to the oligomer by the water in the bottom of the reaction column. The degree of oligomerization or polymerization is controllable via the quantity of water used.

The head distillate of the reaction column (so-called acid reflux) arising is condensed and fed back onto the column a short distance below the feed point for the reaction mixture from the pre-reactor. It is not fed into the bottom of the reaction column or at a point in the column which is closer to the bottom than the stated metering point. This is done in order to avoid too high a volume of acid reflux reaching the bottom and making the condensation reaction there uncontrollable.

Thus the HCl liberated in the process is completely removed from the reaction system via the waste gas pipe with the result that the silicone resin intermediate to be withdrawn from the bottom accumulates with a residual HCl content (titratable) less than 100 ppm. The silicone resin intermediate thus produced in the bottom of the reaction column can if desired be withdrawn from the bottom of the reaction column and analytically characterized. It is characterized by low viscosity (<100 mm$^2$/s) and high residual alkoxy contents of >20 wt. %.

In a typical example, the following analytical data were obtained for the silicone resin intermediate:
Molecular composition from $^{29}$Si NMR:
$MeSiO_{3/2}+^iOctSiO_{3/2}$: 11.8 mol. %,
$MeSi(OEt)O_{2/2}+^iOctSi(OEt)O_{3/2}$: 50.8 mol. %, $MeSi(OMe)_2O_{1/2}+^iOctSi(OEt)_2O_{3/2}$: 30.0 mol. %, $MeSi(OMe)_3+^iOctSi(OEt)_3$: 6.4 mol. %
$Me_2SiO_{2/2}$: 0.8 mol. % (because of slight contents of dimethyldichlorosilane in methyltrichlorosilane)
$Me_2Si(OEt)O_{1/2}$: 0.2 mol. % (because of slight contents of dimethyldichlorosilane in methyltrichlorosilane)
Ethoxy content: 34.2 wt. %,
Content of $^iOctSi(OEt)_{0-3}O_{3-0/2}$: 9.1 wt. %
Mw: 4200 g/mol
Mn: 900 g/mol
PD: 4.7

The reaction product from the bottom of the reaction column is passed into the reaction loop on the same scale as it is formed. Here the reaction product from the bottom of the column consists of a mixture of equal parts of ethanol and silicone resin intermediate, as was used for filling the reaction loop. 50 g of a 1.3 wt. % aqueous hydrochloric acid solution are metered into the initial mixture in the reaction loop in order to start the reaction. The silicone resin intermediate from the bottom of the reaction column is then fed into the reaction loop together with aqueous hydrochloric acid (200 g/hr of a 1.3 wt. % aqueous HCl solution) on the same scale as condensed end product is removed from the reaction loop.

In this, the educt streams are metered such that an average residence time of 15 minutes and a solids content (dissolved resin in alcohol) of 35-40% is established.

The condensed, HCl-acidic loop end product thus produced is neutralized with a 30% solution of sodium methylate in methanol and then filtered.

After this, the alcoholic end product solution is distilled and a liquid end product is obtained which is defined by product parameters such as viscosity, residual alkoxy content and molecular weight distribution. In a typical example, the following analytical data were obtained:
Molecular composition from 29Si NMR:
$MeSiO_{3/2}+^iOctSiO_{3/2}$: 50.0 mol. %,
$MeSi(OEt)O_{2/2}+^iOctSi(OEt)O_{3/2}$: 44.5 mol. %,
$MeSi(OMe)_2O_{1/2}+^iOctSi(OEt)_2O_{3/2}$: 4.5 mol. %,
$MeSi(OMe)_3+^iOctSi(OEt)_3$: 0.2 mol. %
$Me_2SiO_{2/2}$: 0.8 mol. % (because of slight contents of dimethyldichlorosilane in methyltrichlorosilane)
$Me_2Si(OEt)O_{1/2}$: 0.0 mol. % (because of slight contents of dimethyldichlorosilane in methyltrichlorosilane)
Ethoxy content: 17.0 wt. %,
Content of $^iOctSi(OEt)_{0-3}O_{3-0/2}$: 8.9 wt. %
further product parameters:
Viscosity: 3600 mm$^2$/s
Mw: 8200 g/mol
Mn: 1900 g/mol
PD: 4.3

Example 2: Process According to the Invention, Partially Continuous Version. Combination of Column and Stirring Device 2744.29 g of the ethanolic solution of the silicone resin intermediate from the bottom of the reaction column from step 1, example 1 are mixed in a 5 l stirring vessel with 83.16 g water and 2.31 g of 20% aqueous hydrochloric acid. The mixture is heated to 80° C., so that a reflux of ethanol forms. It is stirred for 2 hours at this temperature. Next it is cooled to 60° C. and then 2.31 g of sodium methylate solution (30% in methanol) are added. The residual hydrochloric acid content is determined by titration against phenolphthalein and is 5 ppm. Next, all volatile components are distilled off at 80° C. and 10 mbar reduced pressure and the end product obtained is filtered through a pressure filter Nutsche through a filter plate with 100 μm pore width. 1100 g of a clear liquid product are obtained, which has the following properties and composition:

Viscosity: 3100 mm$^2$/s
Molecular weight and heterogeneity:
Mw=8350 g/mol
Mn=1190 g/mol
PD=7.0
Molecular composition from $^{29}$Si NMR:
MeSiO$_{3/2}$+$^i$OctSiO$_{3/2}$: 49.4 mol. %,
MeSi (OEt) O$_{2/2}$+$^i$OctSi (OEt) O$_{3/2}$: 46.9 mol. %,
MeSi (OMe)$_2$O$_{1/2}$+$^i$OctSi (OEt)$_2$O$_{3/2}$: 3.7 mol. %,
Ethoxy content: 16.9 wt. %,
0.56% silicon-bonded OH groups Example 3: Process According to the Invention, Partially Continuous Version. Combination of Column and Stirring Device with MSE 110

The first step is performed as described in Example 1, with exclusively methyltrichlorosilane now being used instead of the silanes methyltrichlorosilane and isooctyltrichlorosilane used in Example 1. Instead of ethanol, methanol is used as the process alcohol, and the temperature on the reaction column is now 64° C. instead of 78° C. All other parameters are selected as in Example 2. A silicone resin intermediate dissolved in methanol, concentration 51%, is obtained. In isolated form, after removal of all volatile components by distillation at 80° C. and 10 mbar reduced pressure, it has the following composition:
MeSiO$_{3/2}$: 29.7 mol. %,
MeSi(OMe)O$_{2/2}$: 55.9 mol. %,
MeSi(OMe)$_2$O$_{1/2}$: 12.9 mol. %,
MeSi(OMe)$_3$: 0.9 mol. %
Me$_2$SiO$_{2/2}$: 0.6 mol. %,
Methoxy content: 30.3 wt. %,
no silanol groups detectable.
Mw=2100 g/mol
Mn=700 g/mol
PD=3.0

In the second step, the silicone resin intermediate from the first step is continuously fed at a rate of 1250 g/hr into a stirred and heatable batch reactor with a reaction volume of one liter. In a second metered addition, 700 g/hr of a mixture of 2500 g methanol, 300 g partially deionized water and 15.2 g of 20% hydrochloric acid are added. The reaction is operated at reflux. 1950 g/hr of reaction mixture are continuously pumped from the reactor into a further stirred vessel and continuously mixed with 4.15 g/hr of 25% sodium methylate solution in methanol. A sample from the stirred vessel has an HCl value of 25 mg HCl/kg. The sample (=end product) after the stripping in the rotary evaporator at 100° C. and 20 mbar is a highly viscous resin soluble in toluene, with a methoxy content of 13.7 wt. % and a silanol content of 1.5 wt. %.
MeSiO$_{3/2}$: 53.2 mol. %,
MeSi (OMe) O$_{2/2}$: 44.3 mol. %,
MeSi(OMe)$_2$O$_{1/2}$: 1.7 mol. %,
MeSi(OMe)$_3$: 0.2 mol. %
Me$_2$SiO$_{2/2}$: 0.6 mol. %
Mw=4700 g/mol
Mn=1100 g/mol
PD=4.3

The invention claimed is:

1. A fully continuous process for the production of branched organopolysiloxanes, comprising:
   a) in a first step, in a column as a first reaction unit, continuously reacting at least one chlorosilane with alcohol to produce a silicone resin intermediate, wherein the reaction takes place
      a)i) with alcohol and water, or
      a)ii) with alcohol, water, and at least one further chlorosilane which differs from the first chlorosilane by being less volatile and having a higher boiling point than the first chlorosilane, and optionally having a lower reactivity,
   wherein 0.1 to 2.0 moles alcohol are used per mole of hydrolyzable chlorine, and the alcohol contains at most 5 wt. % water, and
   b) in a second step, introducing the silicone resin intermediate from the first step into a continuous loop reactor, a stirred batch reactor with continuous input and output, or a continuously connected stirring device cascade as a second reaction unit, and reacting the silicone resin intermediate,
      b)i) with alcohol and water and in the presence of catalytic traces of hydrogen chloride, or
      b)ii) with alcohol and water and in the presence of catalytic traces of hydrogen chloride and with addition of one or more further alkoxy- and/or hydroxy-functionalized organopolysiloxanes or alkoxy- and/or hydroxy-functionalized silanes,
   to produce a branched organopolysiloxane with a targeted degree of condensation,
   with the proviso that during the whole process, apart from the alcohol, no other solvent is used,
   wherein the alcohol can comprise only one type of alcohol or a mixture of at least two different alcohols.

2. A partially continuous process for the production of branched organopolysiloxanes, comprising:
   a) in a first step, in a column as a first reaction unit, continuously reacting at least one chlorosilane to produce a silicone resin intermediate, wherein the reaction takes place
      a)i) with alcohol and water, or
      a)ii) with alcohol, water, and at least one further chlorosilane which differs from the first chlorosilane by being less volatile and having a higher boiling point, and optionally having a lower reactivity,
   wherein 0.1 to 2.0 moles alcohol are used per mole of hydrolyzable chlorine, and the alcohol contains at most 5 wt. % water, and
   b) in a second step the silicone resin intermediate from the first step is transferred into a stirred discontinuously operated batch reactor as a second reaction unit, and therein reacting the silicone resin intermediate
      b)i) with alcohol and water and in the presence of catalytic traces of hydrogen chloride, or
      b)ii) with alcohol and water and in the presence of catalytic traces of hydrogen chloride and with addition of one or more further alkoxy- and/or hydroxy-functionalized organopolysiloxanes or alkoxy- and/or hydroxy-functionalized silanes,
   to provide as an end product, a branched organopolysiloxane with a targeted degree of condensation,
   with the proviso that during the entire process apart from the alcohol, no other solvent is employed,
   wherein the alcohol can consist of only one type of alcohol or of a mixture of at least two different alcohols.

3. The process of claim 1, wherein the alcohol in the first step contains at most 4 wt. % water.

4. The process of claim 2, wherein the alcohol in the first step contains at most 4 wt. % water.

5. The process of claim 1, wherein a hydrochloric acid-containing head distillate of the column of the first step is condensed and fed back onto the column a short distance below the feed point of the reaction mixture from a pre-reactor, so that it does not reach the bottom of the column and thus the hydrochloric acid liberated in the column is wholly removed from the reaction system and as a result the silicone resin intermediate in the bottom of the reaction column without further workup accumulates with less than 100 ppm residual hydrochloric acid content.

6. The process of claim 2, wherein a hydrochloric acid-containing head distillate of the column of the first step is condensed and fed back onto the column a short distance below the feed point of the reaction mixture from a pre-reactor, so that it does not reach the bottom of the column and thus the hydrochloric acid liberated in the column is wholly removed from the reaction system and as a result the silicone resin intermediate in the bottom of the reaction column without further workup accumulates with less than 100 ppm residual hydrochloric acid content.

7. The process of claim 3, wherein a hydrochloric acid-containing head distillate of the column of the first step is condensed and fed back onto the column a short distance below the feed point of the reaction mixture from a pre-reactor, so that it does not reach the bottom of the column and thus the hydrochloric acid liberated in the column is wholly removed from the reaction system and as a result the silicone resin intermediate in the bottom of the reaction column without further workup accumulates with less than 100 ppm residual hydrochloric acid content.

8. The process of claim 4, wherein a hydrochloric acid-containing head distillate of the column of the first step is condensed and fed back onto the column a short distance below the feed point of the reaction mixture from a pre-reactor, so that it does not reach the bottom of the column and thus the hydrochloric acid liberated in the column is wholly removed from the reaction system and as a result the silicone resin intermediate in the bottom of the reaction column without further workup accumulates with less than 100 ppm residual hydrochloric acid content.

* * * * *